L. W. ZAAR.
ANTIFRICTION BEARING.
APPLICATION FILED JAN. 12, 1917.
1,243,028.
Patented Oct. 16, 1917.
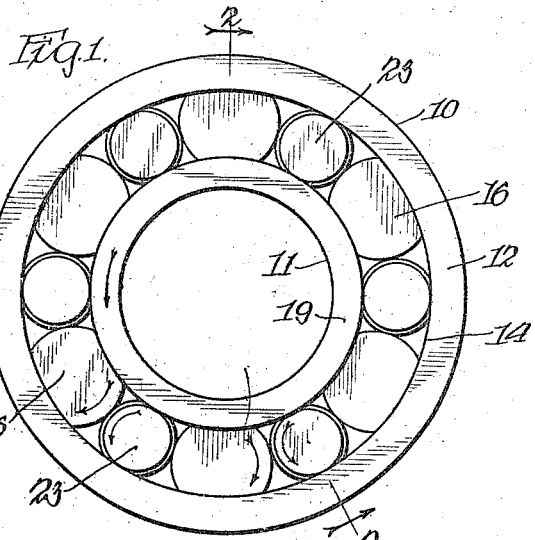
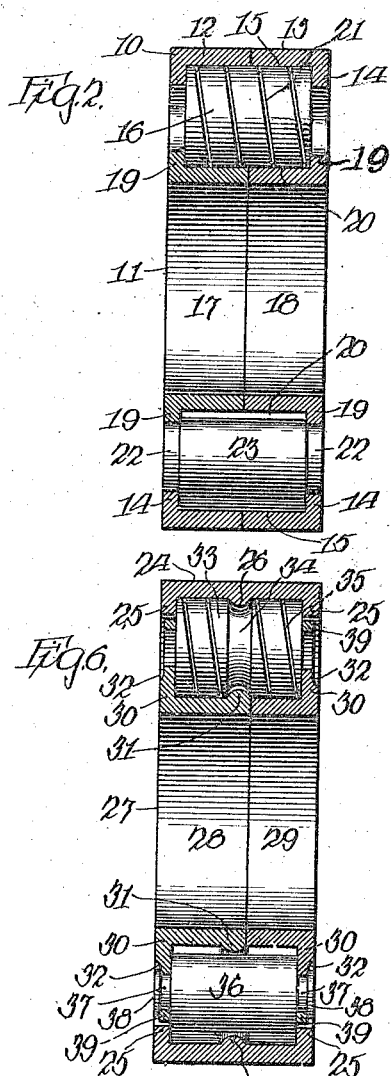
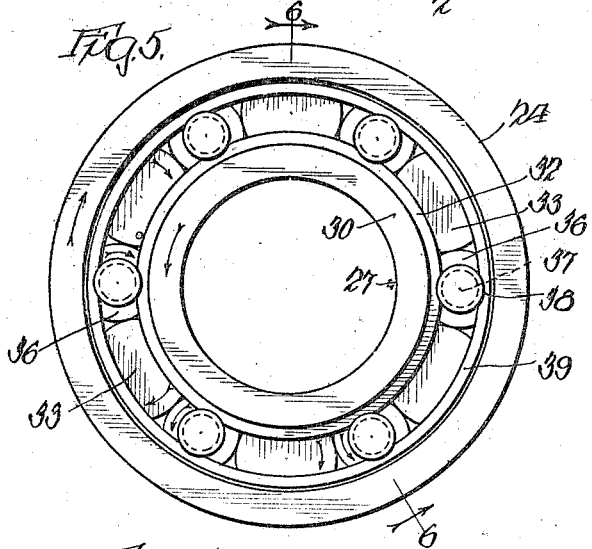
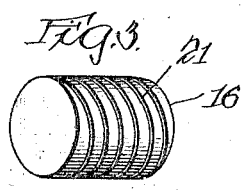
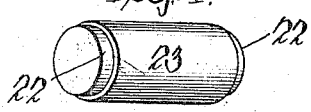
Witness:
L. F. Pujick.
Inventor:
Ludwig W. Zaar.
By Chas. E. Tillman
Atty.

UNITED STATES PATENT OFFICE.

LUDWIG W. ZAAR, OF CHICAGO, ILLINOIS.

ANTIFRICTION-BEARING.

1,243,028.  Specification of Letters Patent.  Patented Oct. 16, 1917.

Application filed January 12, 1917.  Serial No. 141,932.

*To all whom it may concern:*

Be it known that I, LUDWIG W. ZAAR, a citizen of the United States, and a resident of Chicago, in the county of Cook and State of Illinois, have invented certain new and useful Improvements in Antifriction-Bearings, of which the following is a specification.

This invention relates to improvements in antifriction bearings of the roller type, and it consists in certain peculiarities of the construction, novel arrangement and operation of the various parts thereof as will be hereinafter more fully set forth and specifically claimed.

The present invention is somewhat similar in construction, operation and appearance to that shown and set forth in my application Serial No. 92,575, filed April 21, 1916, for improvements in antifriction bearings and has for its principal object the same object as that disclosed in my aforesaid application, to wit, to provide an antifriction bearing of the roller type, which shall be extremely simple and inexpensive in construction, strong and durable, and so made that the parts thereof can be readily assembled for use, or disassembled for repairs or the replacement of parts should they become defective or impaired. Another important object of the invention is to so construct, combine and arrange the various parts of the bearing as to reduce to a minimum the friction incident to the operation of the parts, to the end, that great ease of operation, as well as, high rotary speed will be afforded to the part or parts of the machine or machinery for which the bearing is used. Still another object of the invention is to provide means for circulation or passage of air between certain parts of the device in order to keep them cool or at a reduced temperature, as well as, to afford means for distribution between certain parts of a lubricant.

Other objects and advantages of the invention will be disclosed in the sub-joined description and explanation.

In the accompanying drawing which serves to illustrate the invention,

Figure 1, is a face view of an anti-friction bearing device embodying one form of the invention, showing the parts thereof in position for use and indicating by arrows the direction of the movement of some of the rollers when under pressure.

Fig. 2, is a view partly in section and partly in elevation taken on line 2—2 of Fig. 1 looking in the direction indicated by the arrows.

Fig. 3, is a detached perspective of one of the larger rollers used in the construction illustrated in Figs. 1 and 2 of the drawing.

Fig. 4, is a similar view of one of the smaller rollers used in said construction.

Fig. 5, is a face view of the anti-friction bearing device embodying a modification in the construction thereof.

Fig. 6, is a sectional view taken on line 6—6 of Fig. 5, looking in the direction indicated by the arrows, but showing the rollers in elevation.

Fig. 7, is a detached perspective view of one of the larger rollers used in the modified construction, and

Fig. 8, is a similar view of one of the smaller rollers used in said modified construction.

Like numerals of reference refer to corresponding parts throughout the different views of the drawing.

Referring now to Figs. 1 to 4 inclusive of the drawing the reference numeral 10 designates as a whole the outer ring or casing, and the numeral 11 designates as a whole, the inner ring or casing for retaining the rollers of the device in operative position. As is clearly shown in Fig. 2, the outer retaining ring 10 is composed of two members 12 and 13 which are circular in shape and are adapted to fit closely together, but separably, at their meeting or inner edges. Each of the members 12 and 13 constituting the outer retaining ring 10 is provided at its outer edge with an inwardly extended annular flange 14 so that when the members 12 and 13 are in juxta-position as shown in Fig. 2, a circumferential groove 15, angular in cross section will be provided as a track for the larger rollers 16 of the device, of the construction which is now under consideration. The inner retaining ring 11 consists of two circular members or rings 17 and 18 which are adapted to fit closely together, but separably as is clearly shown in Fig. 2 of the drawing. Each of the members 17 and 18 is provided at its outer edge with an annular outwardly extended flange 19 which when the members 17 and 18 are in juxta-position with one another as shown in Fig. 2, will provide a circumferential groove or channel 20 on the outer surface of the ring 11 as a track for the larger rollers 16 of the device. The members 12 and 13 of the outer retaining ring 10 and the members 17 and 18 of the inner retaining ring 11, may be held in contact with each other as shown in Fig. 2, by means of a housing, (not shown) or otherwise, when the device is in place on a shaft, axle or other part of the machine to which the device may be applied. Each of the larger rollers 16 is provided with a spiral groove 21 extended from one end of the roller to the other end thereof, which groove will permit of the passage of air, or will act as a distributing channel for the distribution of a lubricant between the parts 10, 11 and 16 as is obvious. It will be observed by reference to Figs. 2 and 3 of the drawing, that the rollers 16 are true cylinders, that is they have no reduced portion at their ends, and that they are adapted to track in the grooves or channels 15 and 20 of the inner and outer retaining rings 10 and 11, respectively, when said members are placed in position for retaining the rollers therebetween. When thus positioned it will be understood that the flanges 14 of the outer retaining ring 10, will be concentrically located with respect to the flanges 19 of the inner retaining ring and at a sufficient distance apart to provide a track for the reduced ends 22 of the smaller rollers 23 which are located alternately between the larger rollers 16 and in contact therewith. By the above mentioned arrangement of the flanges 14 and 19 on the retaining rings of the device, it will be understood and seen by reference to Fig. 2, that the reduced portions 22 of the smaller rollers will track on the adjacent surfaces of the flanges 14 and 19 but will be out of contact with the adjacent surfaces of the channels 15 and 20, and that the larger rollers will have independent tracks or guide-ways from those of the smaller rollers.

Referring now to Figs. 5 to 8 inclusive, the outer retaining ring is designated as a whole by the numeral 24 and consists of a single piece having at each of its edges an inwardly extended annular flange 25 which flanges produce on the inner surface of the ring 24 a channel which is substantially angular in cross-section. The ring 24 is provided midway between the flanges 25 thereon with an inwardly extended circumferential bead or rib 26 rounded on its inner surface as is clearly shown in Fig. 6 of the drawing.

In this modified construction the inner retaining ring of the device is designated as a whole by the numeral 27 and consists of two members 28 and 29 each of which is provided at its outer edge with an outwardly extended annular flange 30 which when the members 28 and 29 are placed together or in their operative position as shown in Fig. 6 will produce on the outer surface of the ring 27 a circumferential channel which is substantially rectangular in cross-section. By reference to Fig. 6 it will be seen that one of the members of the inner retaining ring 27, usually the member 28, is wider than the other member of said ring, and has on its outer surface at its inner edge an annular bead or rib 31 which is rounded on its outer surface. Each of the flanges 30 is provided on its outer surface with an annular recess 32 for the purpose to be presently explained. The larger rollers 33 used in the modified construction are each cylindrical in shape and without reduced portions at their ends. Each of these larger rollers is provided at its middle with a circumferential groove 34 to receive the beads or ribs 26 and 31 on the inner surface of the ring 24 and outer surface of the ring 27 respectively. It will be observed by reference to Fig. 6, that the outer portions of the grooves 34 engage the outer or side portions of said bead or ribs and that the inner portions of the latter are free or spaced from the inner surface of the grooves 34 in the larger rollers, and that by this arrangement lateral thrusts of the larger rollers will be prevented and friction thereby reduced and also that the space between the inner surface of the grooves 34 and the beads or ribs will permit the passage of air or a lubricant which may be conducted thereto or therefrom by means of the spiral grooves 35 with which the larger rollers in the modified construction are provided on each side of the circumferential groove 34 therein. Each of the smaller rollers 36 used in the modified construction is provided at each of its ends with a reduced portion or stud shaft 37 each of which shafts has on its outer end an annular flange 38, see Figs. 6 and 8 of the drawing. These flanges will operate in the recesses 32 of the flanges 30 on the inner retaining ring 27 and also serve to hold in position the rings 39 one of which is located on each side of the rollers 33 and 36 and between the shafts 37 on the smaller rollers and the flanges 25 of the outer retaining ring. As the flanges or disk heads on the smaller rollers 36 overlap the rings 39 it is evident that said rings will be loosely retained in their respective positions at the ends or sides of the rollers.

While I have shown in Fig. 2 of the drawing, the inner and outer retaining rings as being made of two pieces each, yet I desire to be understood that either the outer or inner ring may be made of a single piece and the other of two pieces as shown in Fig. 6 of the drawing, without departing from the spirit of the invention. By making one or both of the rings of two pieces, it is evident that the assemblage of the parts or their disassemblage will be greatly facilitated.

From the foregoing and by reference to the drawings, it will be readily understood and clearly seen, that, in the operation of the device, the inner ring which is adapted to carry the shaft, axle, or other part of the machine will have or exert greater pressure on some of the rollers than on others, and that those rollers which are subjected to considerable pressure between the outer and retaining ring will be moved in pairs in the same direction as indicated by the arrows in Figs. 1 and 5 of the drawing.

While I have illustrated and described an embodiment of the invention, in two forms of construction for carrying it into effect, yet it is capable of variations and modifications without departing from the spirit of the invention. I, therefore, do not wish to be limited to the precise details of the construction as set forth and disclosed, but desire to avail myself of such variations, modifications and modes of the use of the invention as come within the scope of the appended claims.

When the peripherally grooved rollers and the heads or ribs on the retaining members are employed, it will be understood that the said rollers will fit loosely between the flanges 25 and 25, 30 and 30, which produce the channels or grooves in which the said rollers travel.

I claim:

1. The combination with an inner and an outer retaining member located in substantially concentric relation and both having an annular angular groove and a pair of flanges on their adjacent surfaces, at least one of said members also having within its groove a circumferentially disposed bead or rib, of a plurality of large cylindrical rollers and a plurality of smaller cylindrical rollers having reduced cylindrical portions at their ends, said rollers being movably interposed between said retaining members and arranged alternately with respect to one another, each of the rollers of the larger set having a circumferential groove between its ends to receive said ribs or beads and each of said larger rollers having its bearings in the grooves of the retaining members, and the set of smaller rollers having its bearings on said flanges of the retaining members.

2. The combination with an inner and an outer retaining member located in substantially concentric relation and having annular grooves and flanges on their adjacent surfaces, each of said members having within its groove a circumferentially disposed bead or rib, of a plurality of large cylindrical rollers and a plurality of smaller cylindrical rollers having reduced cylindrical portions at their ends, said rollers being movably interposed between said retaining members and arranged alternately with respect to one another, each of the rollers of the larger set having a circumferential groove between its ends to receive said ribs or beads and each of said larger rollers having its bearings in the grooves of the retaining members, the set of smaller rollers having its bearings on said flanges of the retaining members, each of the reduced portions of said smaller members having a peripheral flange at its outer end, and a ring surrounding the group of reduced portions at each of the ends of the smaller rollers and interposed between said peripheral flanges and the ends of the larger rollers.

3. The combination with an inner and an outer retaining member located in substantially concentric relation and having annular grooves and flanges on their adjacent surfaces, of a plurality of large rollers and a plurality of smaller rollers having reduced cylindrical portions at their ends, said rollers being movably interposed between said retaining members and arranged alternately with respect to one another, the set of larger rollers having its bearings in the grooves of the retaining members, the set of smaller rollers having its bearings on said flanges, each of the reduced portions of said smaller members having a peripheral flange at its outer end, and a ring surrounding the group of reduced portions at each of the ends of the smaller rollers and interposed between said peripheral flanges and the ends of the larger rollers.

LUDWIG W. ZAAR.

Witnesses:
CHAS. C. TILLMAN,
L. F. PUZICK.

Copies of this patent may be obtained for five cents each, by addressing the "Commissioner of Patents, Washington, D. C."